(12) United States Patent
Richter et al.

(10) Patent No.: US 7,400,913 B2
(45) Date of Patent: Jul. 15, 2008

(54) POSITION-HOLDING PIVOT/SLIDE MECHANISM FOR CELL PHONE

(75) Inventors: Michael Richter, Schalksmühle (DE); Lothar Fuhrmeister, Schalksmühle (DE)

(73) Assignee: Lumberg Connect GmbH & Co. KG, Schalksmuhle (DE)

( * ) Notice: Subject to any disclaimer, the term of this patent is extended or adjusted under 35 U.S.C. 154(b) by 403 days.

(21) Appl. No.: 11/293,849

(22) Filed: Dec. 2, 2005

(65) Prior Publication Data
US 2006/0135199 A1 Jun. 22, 2006

(30) Foreign Application Priority Data
Dec. 8, 2004 (DE) .................. 10 2004 059 236

(51) Int. Cl.
*H04M 1/00* (2006.01)
(52) U.S. Cl. .............. 455/575.1; 455/575.1; 455/575.4; 455/575.8; 379/433.13; 379/433.11; 379/433.12
(58) Field of Classification Search .............. 455/575.1, 455/575.3, 575.4, 575.5, 575.8; 379/433.11, 379/433.13, 432, 433, 428.01–428.04
See application file for complete search history.

(56) References Cited

U.S. PATENT DOCUMENTS

| 5,185,790 | A | 2/1993 | Mischneko et al. |
| 5,316,168 | A | 5/1994 | Finch et al. |
| 5,661,797 | A | 8/1997 | Leman |
| 6,085,387 | A | 7/2000 | Han |
| 2002/0198016 | A1 | 12/2002 | Gupte |
| 2004/0098833 | A1 | 5/2004 | Lu |
| 2004/0203517 | A1* | 10/2004 | Park et al. .................. 455/90.3 |
| 2004/0203523 | A1 | 10/2004 | Harmon |
| 2005/0054393 | A1* | 3/2005 | Fagerstrom et al. ....... 455/575.1 |
| 2006/0030381 | A1* | 2/2006 | Byun et al. ............... 455/575.4 |
| 2006/0098813 | A1* | 5/2006 | Takamori et al. ........ 379/433.13 |

FOREIGN PATENT DOCUMENTS

EP 0 961 459 12/1999

* cited by examiner

*Primary Examiner*—Nick Corsaro
*Assistant Examiner*—Mehmood B Khan
(74) *Attorney, Agent, or Firm*—Andrew Wilford

(57) ABSTRACT

A base part has a planar inner face, and a cover part is shiftable on the inner face between a closed position overlying and congruent with the base part and an open position exposing at least part of the inner face. A pair of parallel elongated spring elements extend parallel to the inner face in one of the parts. A pivot in the one part between the center portions carries a nonround cam for movement between a pair of end positions engaging and slightly transversely elastically deflecting the center portions and a through a center position engaging and greatly transversely elastically deflecting the center portions. The cam is connected to the other of the parts to pivot between its end positions and through the center position on displacement of the cover part between the closed position and the open position.

12 Claims, 6 Drawing Sheets

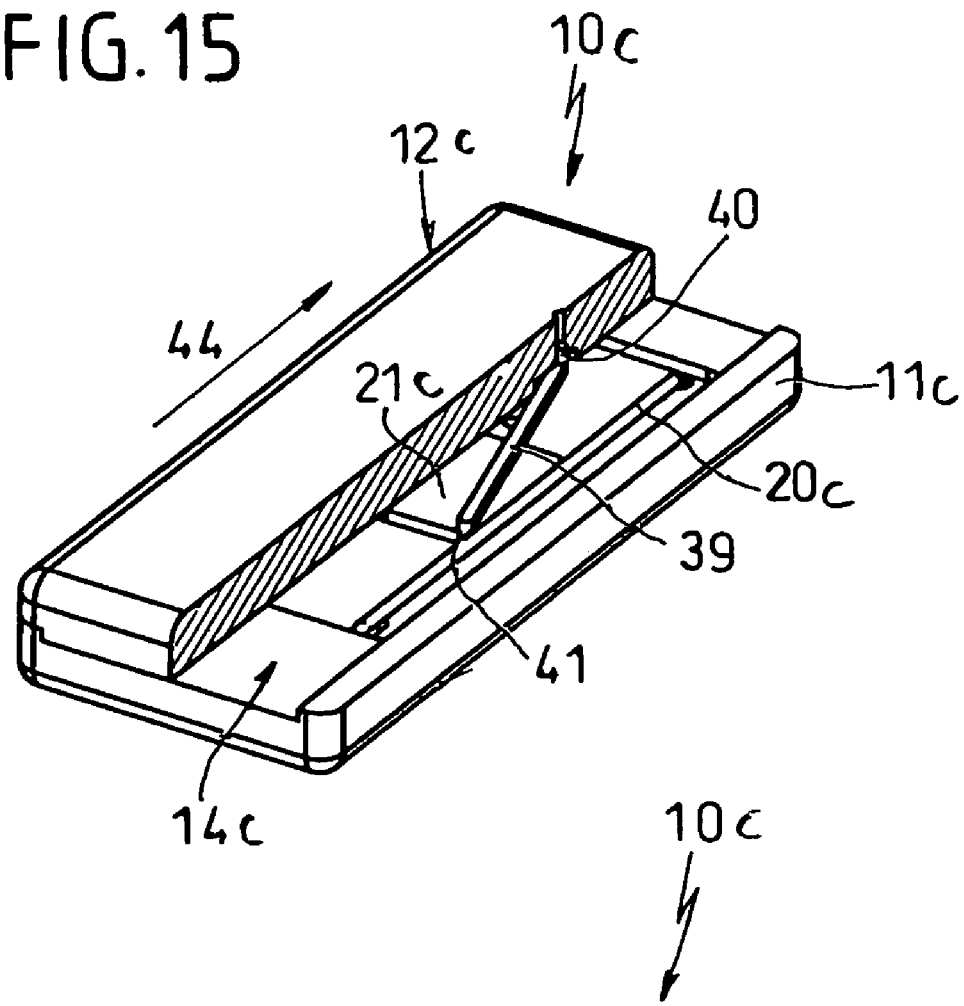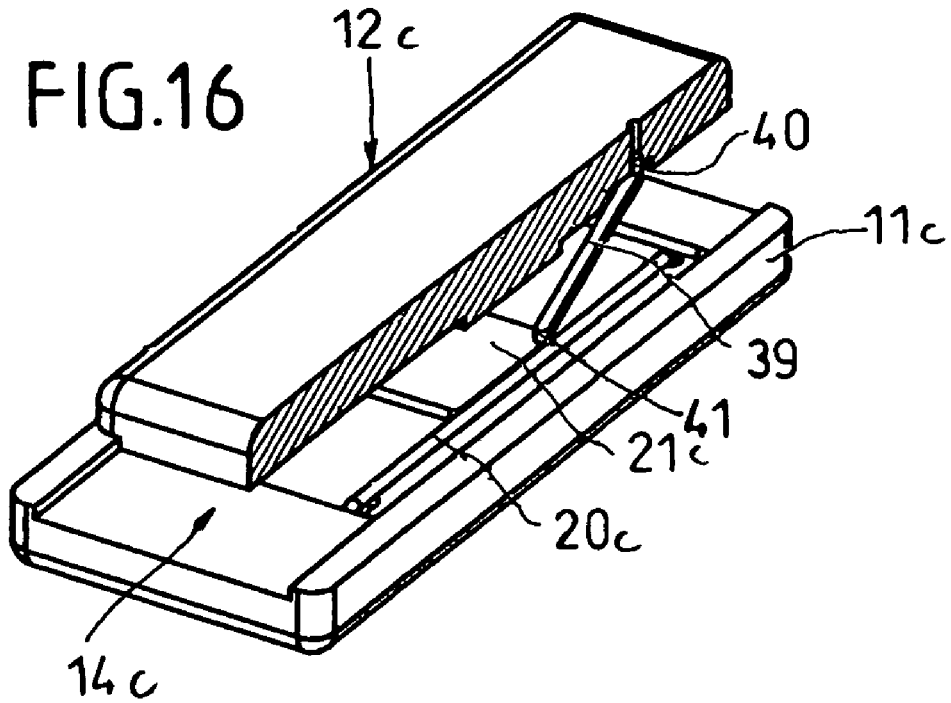

POSITION-HOLDING PIVOT/SLIDE MECHANISM FOR CELL PHONE

FIELD OF THE INVENTION

The present invention relates to a mounting mechanism for a two-part device. More particularly this invention concerns position-holding pivot/slide mechanism for a cell phone.

BACKGROUND OF THE INVENTION

It is standard for a small portable electronic device—cell phone, PDA, MP3 player—to be constructed as two rigid parts, one of which carries a sensitive subassembly, for instance a display, keypad, or keyboard. The two parts, typically termed the cover and the base, are permanently connected together and can be moved between a closed position in which they take up minimal volume and the sensitive subassembly of the base is covered and protected by the cover, and an open position in which they are spread apart and the subassembly is exposed and usable.

There are three basic systems, best illustrated by the cell phone: The flip style simply has the cover and base hinged together along one edge to open and close like a clam. This is seen in the Siemens CF62 pivot phone, where the inner face of the cover carries the display and that of the base the keypad.

The pivot style also has a cover and base that lie in respective parallel planes, but the cover is pivotal relative to the base about an axis passing normally centrally through the cover and base perpendicular to the planes. The cover and base are elongated in their planes so that, when open, they cross each other. Such a system is seen in the Siemens SK65 and is useful to expose a fairly large keyboard on the base, with the outer face of the cover carrying the display.

The third system is the slide type and has, like the pivot type, elongated cover and base parts of the same shape and lying in respective parallel planes, but here the cover slides in its plane relative to the base, lengthening the device when open. This is embodied in the Siemens SL65 cell phone where the base carries at one end a keypad and the outer face of the cover has the display.

In all three systems it is necessary to provide a pivot and/or guide mechanism that allows the cover and base to move between the open and closed end positions smoothly, and also that urges them into and positively retains them in their end positions. Thus if the phone is open half way or more, it will snap into the full-open position, and if closed more than half way will snap into the full-closed position. Systems for doing this can be seen in U.S. Pat. Nos. 5,661,797, 5,983,083, and 6,085,387 and in U.S. patent publications 2002/0198016 and 2004/0098833.

Most of these mechanisms are fairly complex and expensive to manufacture. Furthermore few are adapted for use in pivot devices and none are useful in slide devices.

OBJECTS OF THE INVENTION

It is therefore an object of the present invention to provide an improved position-holding mechanism for electronic device.

Another object is the provision of such an improved position-holding mechanism for electronic device that overcomes the above-given disadvantages, in particular that is of simple construction and cheap to manufacture.

A further object is such a mechanism that is particular usable in a pivot- or slide-type device.

SUMMARY OF THE INVENTION

A base part has a generally planar inner face, and a cover part is shiftable on the inner face generally parallel to the inner face between a closed position overlying and generally congruent with the base part and an open position offset therefrom and exposing at least part of the inner face. A pair of generally parallel and transversely spaced elongated spring elements extend generally parallel to the inner face and each have at least one end seated in one of the parts and a transversely elastically deflectable center portion. A pivot in the one part between the center portions defines an axis generally perpendicular to the inner face. A polygonal cam on the pivot between the spring elements is pivotal about the axis between a pair of end positions engaging and slightly transversely elastically deflecting the center portions and a through a center position engaging and greatly transversely elastically deflecting the center portions. The cam is connected to the other of the parts to pivot between its end positions and through the center position on displacement of the cover part between the closed position and the open position so that the spring elements urge the other part into the open and closed end positions from positions therebetween.

This structure is extremely simple and very compact. It can easily fit in a very shallow space between the two parts. Furthermore the use of two identical springs symmetrically flanking the cam eliminates any significant radial stress on its pivot, merely subjecting the cam to compression that it can easily resist. In spite of the simplicity and compactness of this structure, it can be counted on to have a long service life and to effectively move the cover part to one of its end positions from virtually any position therebetween.

According to the invention the parts are generally congruent and the cover part substantially completely covers the inner face in the closed position. The base part is normally provided with a sensitive subassembly, e.g. a keypad, keyboard, or display, exposed at the inner face. It is also possible for the base part to carry the keypad or keyboard, and to provide an outer face of the cover part with a display.

The cover part in accordance with an embodiment of the invention is pivotal about the axis on the base part between the open position and closed position. In this case the means connecting the cam to the other part is structure fixing the cam on the cover part. In fact the cam can be unitarily formed with the body of the cover part.

In accordance with another embodiment of the invention the cover part is slidable in a straight line parallel to the axis on the base part. The connecting means in this case is a link extending between the cover part and the cam. This link is a stiff rod having one end pivoted in the cover part and an opposite end pivoted in the cam offset from the axis.

The cam according to the invention is polygonal and has two pairs of parallel flat sides each engaging the spring elements in a respective one of the open and closed positions. Corners between the sides spread the spring elements in the metastable center position. In a simple system the cam is substantially square and moves through 90° between its end positions.

The spring elements are rods, typically of spring steel. Most of the other parts can be made of a durable plastic. Each of the spring rods has two ends both seated in the one part.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 15 and 16 are perspective views of the FIG. 3 slide device in the closed and open positions, with part of the cover in section to reveal underlying structure.

SPECIFIC DESCRIPTION

Figure 1:
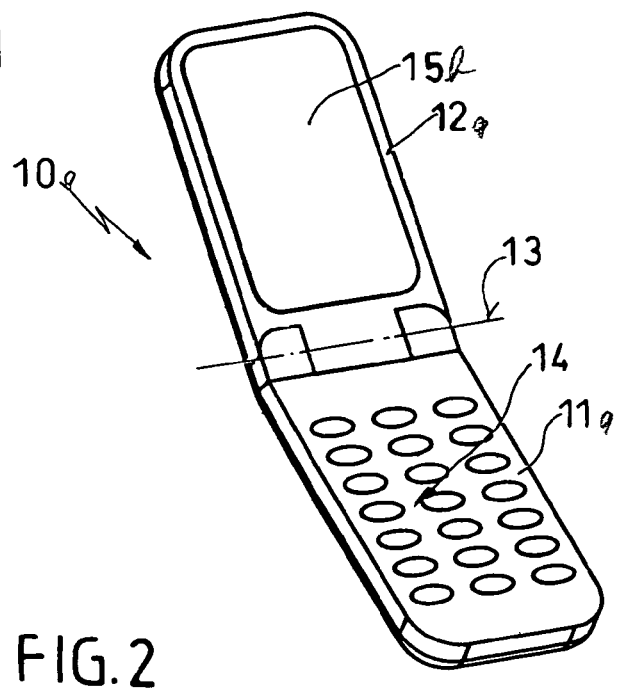
FIGS. 1, 2, and 3 are simple perspective views illustrating flip-, pivot-, and slide-type cell phones in the open position.

As seen in FIG. 1 a flip-type cell phone 10a has a base part 11a and a cover part 12a hinged together along one edge at an axis 13. The inner faces of the parts 11a and 12a, that is the faces that lie against each other and that are concealed in an unillustrated closed position, respectively carry a keypad 14a and a display 15a.

Figure 2:
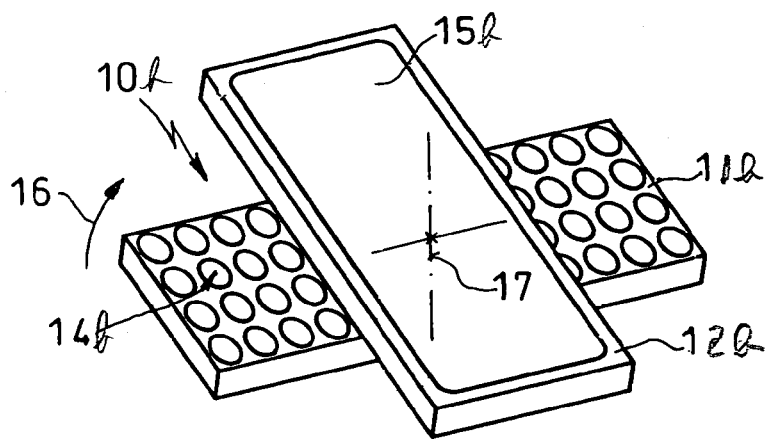

FIG. 2 shows a pivot-type cell phone 10b having a rectangular and flat base 11b whose inner face carries a keypad or keyboard 14b and a similarly shaped cover 12b whose outer face, that is the face turned away from the other part 11b, carries a display 15b. The cover part 11b can pivot as shown by arrow 16 relative to the part 12b about an axis 17 that extends centrally through the two parts 11b and 12b perpendicular to their planes.

Figure 3:
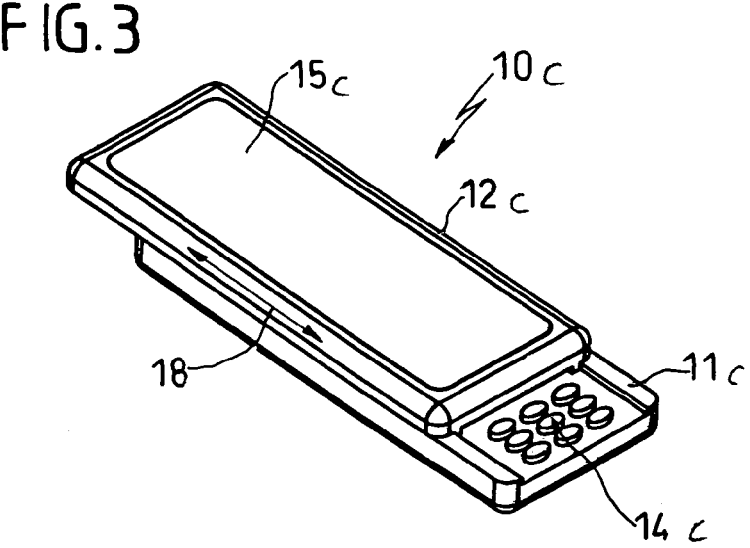

In FIG. 3 a slide-type cell phone 10c has a rectangular and flat base part 11c whose inner face carrying at one end a small keypad 14c and a similarly shaped cover part 12c whose outer face carries a display 15c. The cover 12c can slide as shown by arrow 18 on the base 11c, that is in a direction parallel to the planes of the two parts 11c and 12c and parallel to the longitudinal extensions of these parts 11c and 12c. In the illustrated open position, the keypad 14c is exposed; in the unillustrated closed positon, it is covered.

FIGS. 4-9 show a mechanism 19a that is provided at the pivot axis 13 in the FIG. 1 phone 10a to spring-bias it into the end closed and open positions. It comprises a spring-steel rod 20a extending parallel to the axis 13 and having ends loosely seated in clips 22 of a mount 23 that is normally fixed to the base part 11. The mount 23 is made of a durable plastic and the clips 22 have open slots or mouths 24 so that the spring 20a can be snapped into them. A pivot rod 25 extending along the axis 13 and fixed in the cover part 12a is journaled in a hole 30 at one end of the mount 23, is snapped in a seat 29 with a mouth 28 at the other end of the mount 23, and has an end 26 fixed in the cover part 12a. This rod 25 is generally of cylindrical shape centered on the axis 13, but has a laterally projecting central ridge or cam formation 21a that is not centered on the axis 13. At one end, the mount 23 has a mouth 28 so that this part 26 can also be snapped in place.

More specifically, the formation 21a has a pair of lightly curved or even planar flanks 27a meeting at a central point 33. When the parts 11a and 12a are at a central metastable position between the end closed and open positions, the bump 33 is pressing radially outward against the center of the rod 21a and deflecting it to a maximum. This is not a stable position and it is not normally possible for the parts 11a and 12a to hold in it.

Figure 4:
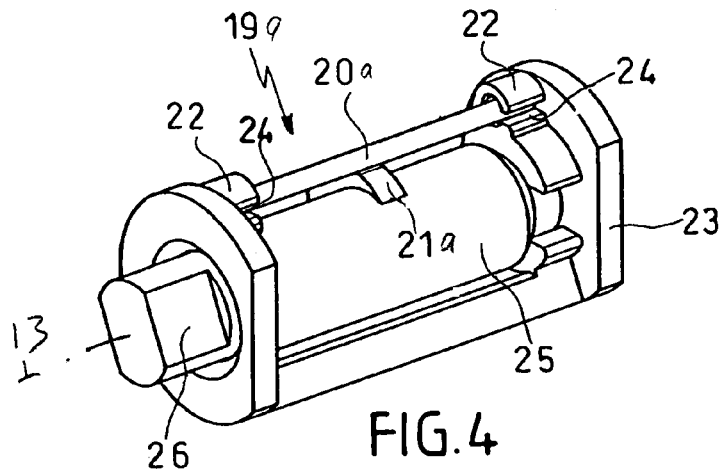
FIGS. 4-6 are perspective views illustrating a pivot mechanism for the flip phone of FIG. 1 in the closed, intermediate, and open positions.
Figure 7:
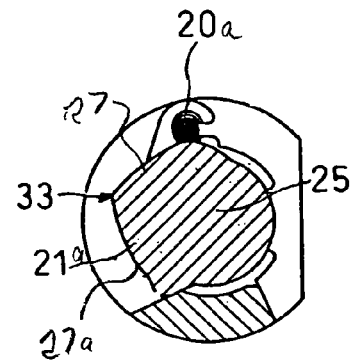
FIGS. 7-9 are cross sections through the structure shown in respective FIGS. 4-6.
Figure 5:
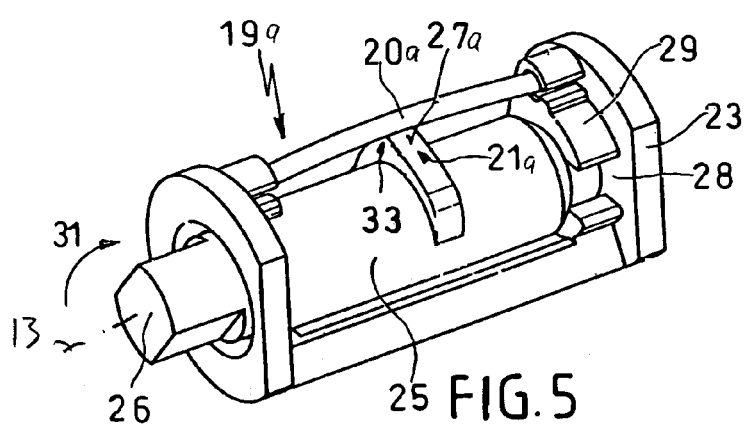
Figure 8:
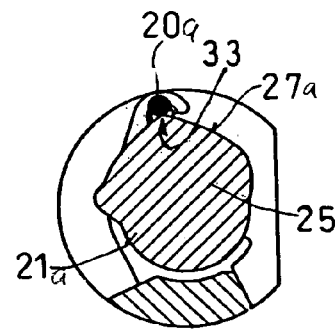
Figure 6:
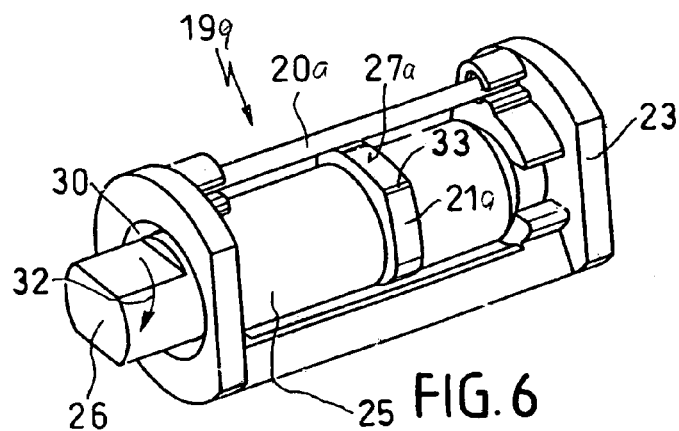
Figure 9:
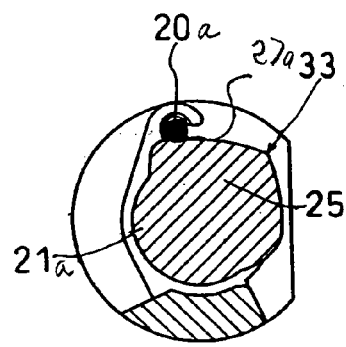

FIGS. 4 and 7 show the mechanism 19a in the closed position, with the rod 20a only slightly deformed at the low end of one of the flanks 27a. FIGS. 5 and 8 show the mechanism with the rod 20a after rotation as shown at 31 at maximum deflection, bent out by the apex 33. FIGS. 6 and 9 show the mechanism after rotation as shown by 32 with the rod 20a at minimal deflection at the low end of the other flank 27a. Clearly the parts 11a and 12a will move from any intermediate position into the closer of the end positions of FIGS. 4 and 7 or FIGS. 6 and 9 and stay there. The camming interaction of the cam ridge 21a and the spring 20a thus ensures that the cell phone 10a will either be fully closed or fully open.

FIGS. 10-14 show the mechanism 19b for the phone 10b of FIG. 2. The cover 12b is formed with a 90° arcuate groove or slot 34 that is centered on the axis 17 and in which fits a pin 35 projecting parallel to the axis 17 from the part 11b. This limits the angular movement of the cover 12b relative to the base 11b to 90°.

Here a pair of transversely spaced and parallel spring rods 20b have bent-down ends 36 seated in holes 37 in a rectangular recess formed in the base 11b, equispaced from the axis 17. The part 12b is provided or formed centered on the axis 17 with a downwardly projecting square cam formation 21b having four flat sides 27b defining four corners 38. The sides 27b have a length equal to slightly more than a transverse spacing S between the rods 20b and the corners 38 are hence spaced diagonally by a distance equal to substantially more than this transverse spacing S.

Figure 10:
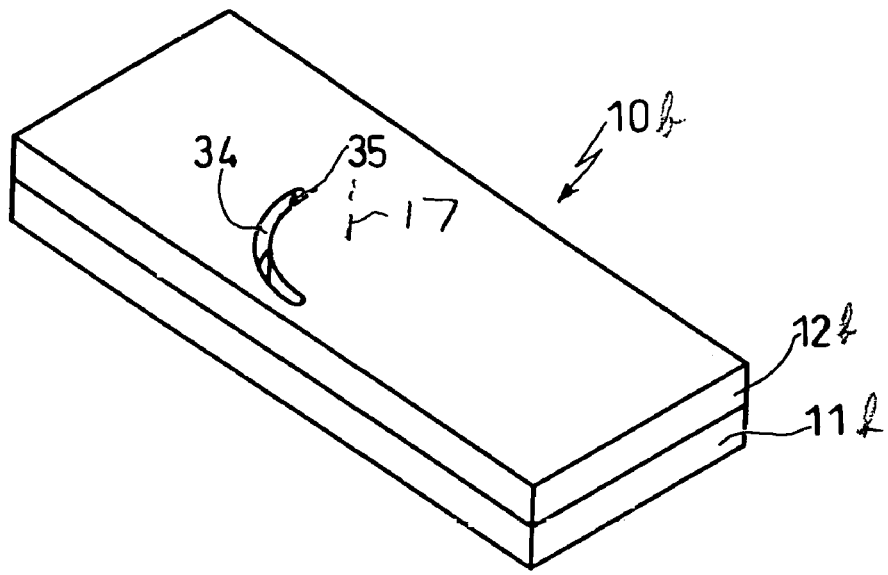
FIGS. 10 and 11 are simple perspective views showing the pivot-type device of FIG. 2 in the closed and open positions, with some parts removed for clarity of view.
Figure 11:
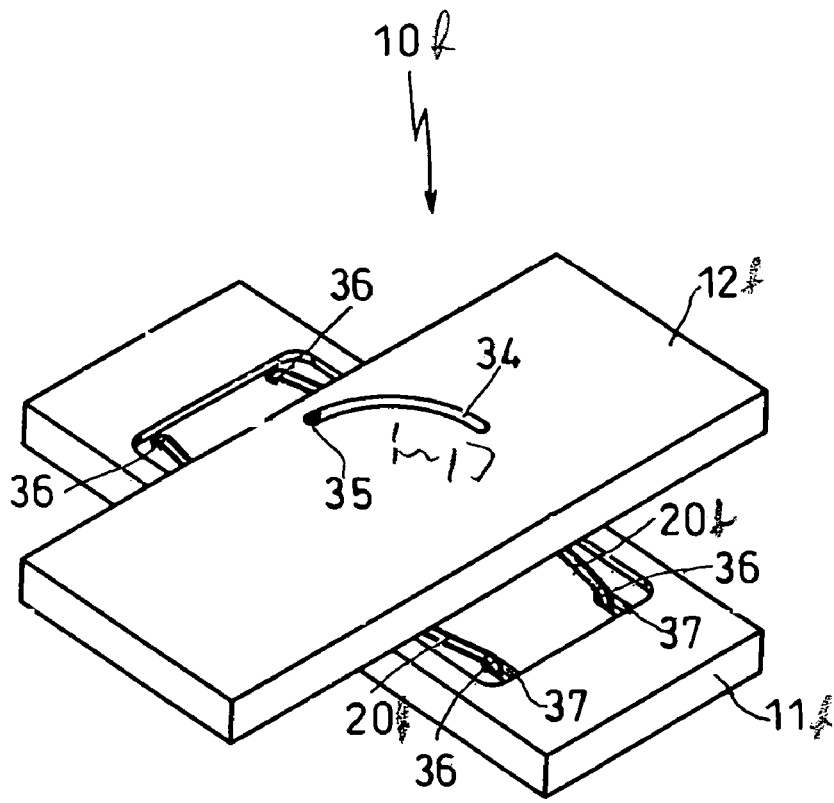
Figure 12:
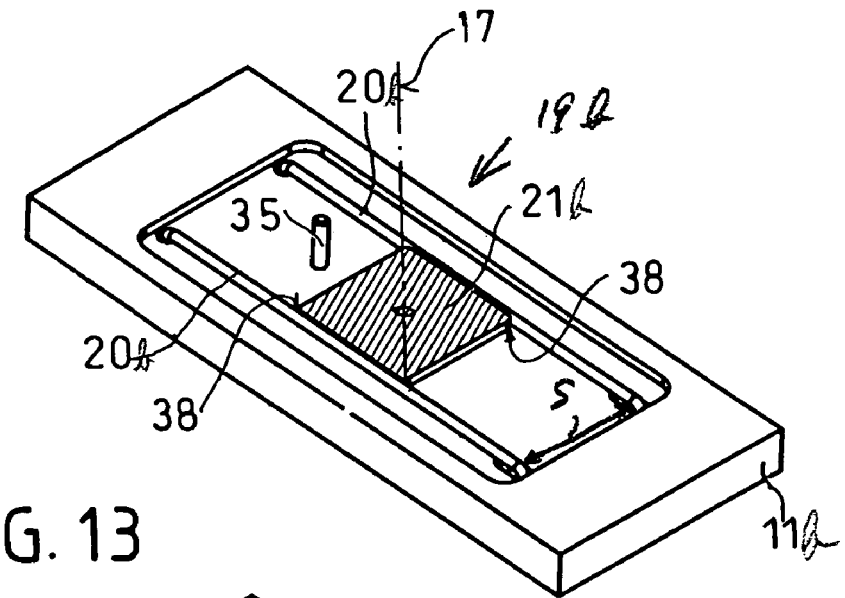
FIGS. 12 through 14 are perspective views showing the base part of the FIG. 2 pivot-type device in the closed, intermediate, and open positions.
Figure 13:
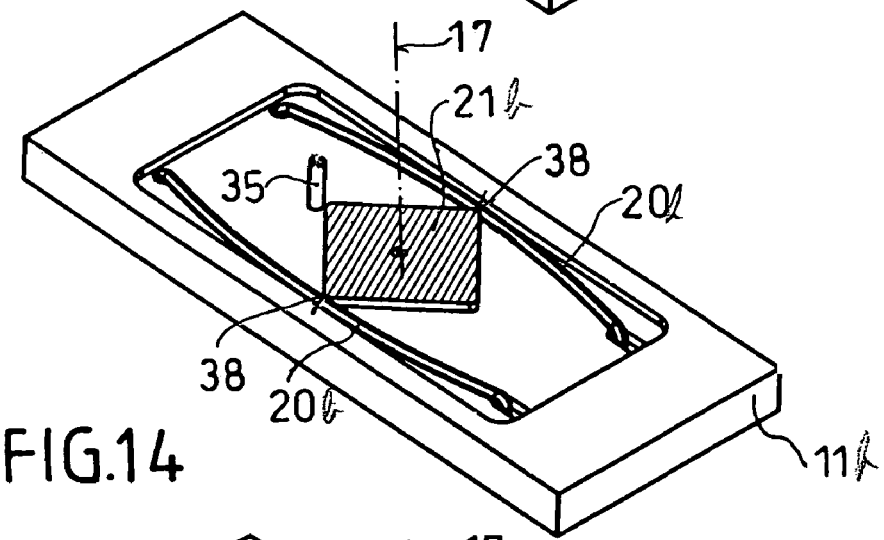
Figure 14:
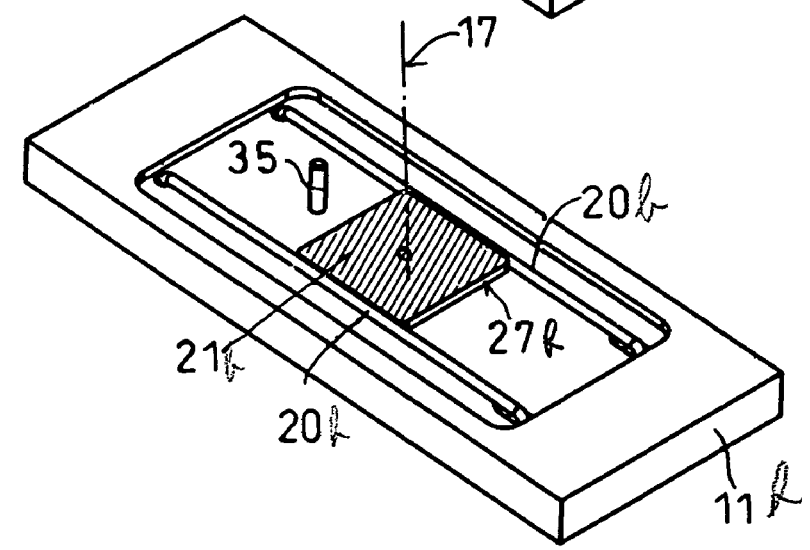

When the cover part 12b is in the end positions of FIGS. 10 and 11 the flat sides 27b engage the rods 20b flatly and minimally deflect then as shown in respective FIGS. 12 and 14. When, however, the cover 12b is angled at 45° to the base 11b, the points 38 maximally deflect the rods 20b in a central metastable position, from which the rods 20b urge the cover 12b into whichever of the end positions is closer. In the end positions the spring force holding the two parts 11b and 12b parallel to each other is low, whereas the force exerted in intermediate positions is higher, meaning that the cover 12b seats gently in the end positions and is easily moved out of them.

The cell phone 10C of FIG. 3 has a mechanism 19c that is much like that of the mechanism 19b, with functionally identical structure assigned the same reference numerals but with a postscript c instead of b. Here, however, as shown in FIGS. 15 through 19 the square cam 21c is pivoted in the base at a pivot pin 42 on the axis 17 and a link bar 39 has a bent-up end 40 pivoted centrally in the cover 12c and an opposite bent-down end 41 pivoted in the cam 21c adjacent one of its corners 38, that is offset outward from the axis 17.

Figure 17:
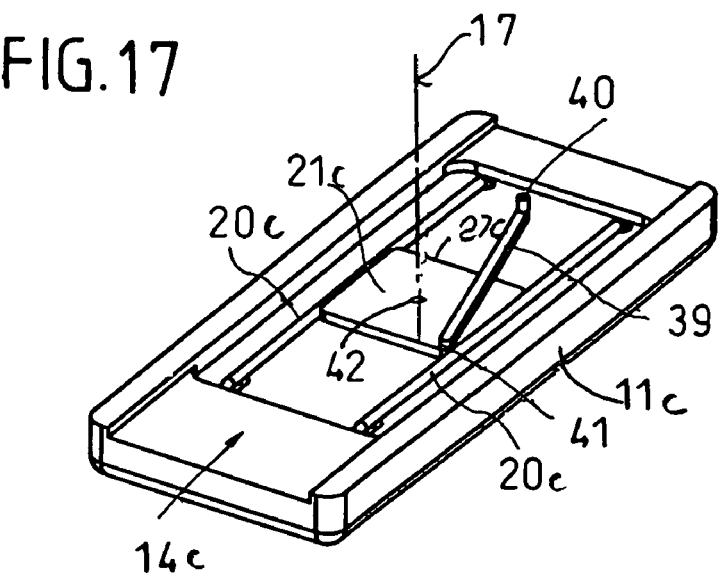
FIGS. 17, 18, and 19 are views showing another slide mechanism usable in the FIG. 3 slide device, in the closed, intermediate, and open positions, respectively.
Figure 18:
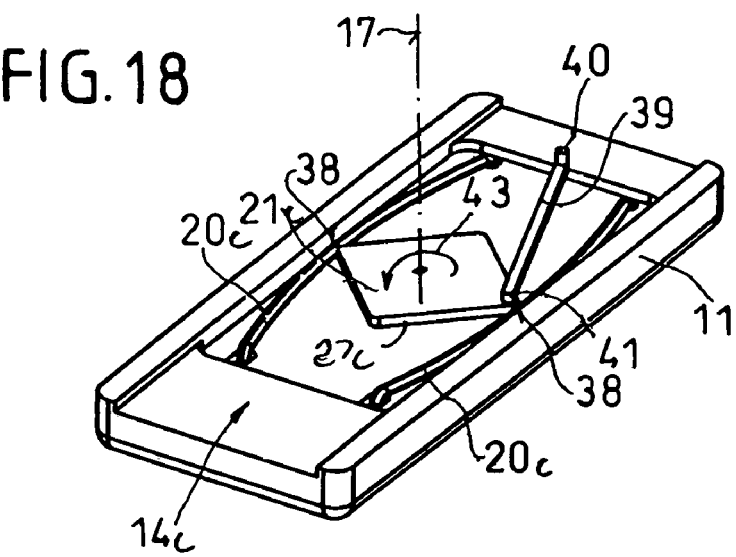
Figure 19:
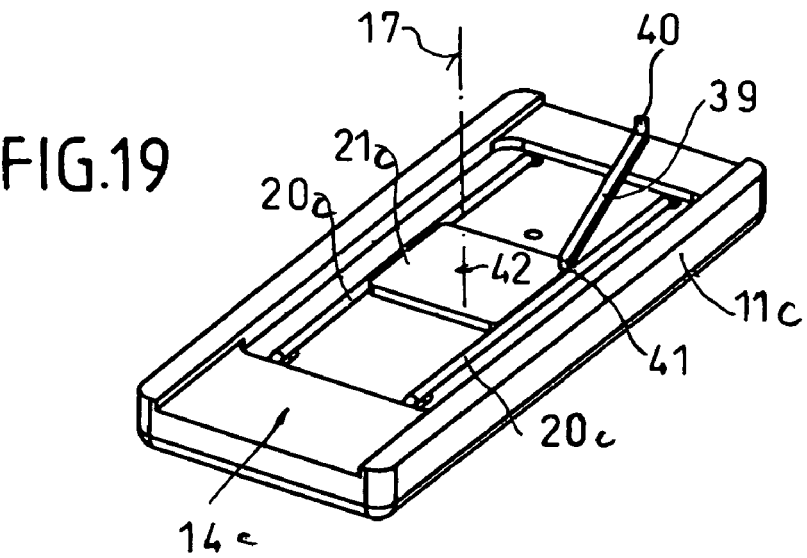

With this system, therefore, as the cover 12c is shifted longitudinally as shown by arrow 44, it pivots the cam 21c as shown by arrow 43 through 900, between a position shown in FIGS. 15 and 17 with two of its flat sides 27c bearing flatly on the rods 20c and deflecting them slightly and a position shown in FIGS. 16 and 19 with the other two of its flat sides 27c doing the same thing. Intermediate these positions the cam 21c spreads the rods 20c ans shown in FIG. 18, producing the automatic return-to-end action described above.

We claim:

1. A device comprising:
a base part having a generally planar inner face;
a cover part shiftable on the inner face generally parallel to the inner face between a closed position overlying and generally congruent with the base part and an open position offset therefrom and exposing at least part of the inner face;
a pair of generally parallel and transversely spaced elongated spring elements extending generally parallel to the inner face and each having at least one end seated in one of the parts and a transversely elastically deflectable center portion;
a pivot in the one part between the center portions defining an axis generally perpendicular to the inner face;
a nonround cam on the pivot between the spring elements and pivotal about the axis between a pair of end positions engaging and slightly transversely elastically deflecting the center portions and a through a center position engaging and greatly transversely elastically deflecting the center portions; and
means connecting the cam to the other of the parts for pivoting the cam between its end positions and through the center position on displacement of the cover part between the closed position and the open position, whereby the spring elements urge the other part into the open and closed end positions from positions therebetween.

2. The device defined in claim 1 wherein the parts are generally congruent and the cover part substantially completely covers the inner face in the closed position.

3. The device defined in claim 1 wherein the base part is provided with a sensitive subassembly exposed at the inner face.

4. The device defined in claim 3 wherein the subassembly is a keypad.

5. The device defined in claim 1 wherein the cover part is pivotal about the axis on the base part between the open position and closed position, the means being structure fixing the cam on the cover part.

6. The device defined in claim 1 wherein the cover part is slidable in a straight line parallel to the axis on the base part, the means being a link extending between the cover part and the cam.

7. The device defined in claim 6 wherein the link is a rod having one end pivoted in the cover part and an opposite end pivoted in the cam offset from the axis.

8. The device defined in claim 1 wherein the cam is polygonal and has two pairs of parallel flat sides each engaging the spring elements in a respective one of the open and closed positions.

9. The device defined in claim 8 wherein the cam is substantially square.

10. The device defined in claim 1 wherein the elements are spring rods.

11. The device defined in claim 10 wherein the rods are of metal.

12. The device defined in claim 1 wherein each of the elements has two ends both seated in the one part.

* * * * *